UNITED STATES PATENT OFFICE.

AUGUSTUS H. VAN MARTER, OF FLEMINGTON, NEW JERSEY.

COMPOSITION OF MATTER FOR USE AS A SOLDERING-FLUX.

1,280,905.     Specification of Letters Patent.     Patented Oct. 8, 1918.

No Drawing.     Application filed January 25, 1917. Serial No. 144,511.

*To all whom it may concern:*

Be it known that I, AUGUSTUS H. VAN MARTER, a citizen of the United States, residing at Flemington, in the county of Hunterdon and State of New Jersey, have invented a new and useful Composition of Matter for Use as a Soldering-Flux, of which the following is a specification.

This invention relates to a composition of matter for use as a flux in soldering aluminum, one of the objects of the invention being to provide a flux which can be sprinkled onto the work in the form of a powder and which will cause the solder when applied to the aluminum surface to combine therewith and form a strong connection between the parts.

With the foregoing and other objects in view the invention consists of the following ingredients in the proportions stated:—

| | |
|---|---|
| Stearic acid | 16 oz. |
| Borax | 2 oz. |
| Rosin | 2 oz. |
| Pulverized cinnamon bark | 5 oz. |

In compounding the mixture, the several parts are thoroughly mixed together and produce a powder which can be sprinkled readily onto the work.

The solder used in connection with the flux preferably consists of a mixture of block tin, 16 ounces, and zinc, 5 ounces.

The parts to be soldered together are placed in proper position relative to each other and the flux is sprinkled thereover. After the soldering iron has been brought to a cherry heat, it is applied to the solder so as to cause the molten solder to be deposited on the flux. The stearic acid when subjected to the heat of the solder and the soldering point operates to loosen the oxid on the surface of the aluminum and the rosin acts as a retarding element to prevent the stearic acid from flowing too rapidly over the surfaces. The borax which is likewise heated, forms a glaze over the cleaned surfaces, thereby preventing the formation of oxid on said surfaces. The pulverized cinnamon bark mixes with the borax and presents a toothed surface which tends to feed or attract the solder to the surfaces on which the borax is affixed, with the result that the solder is promptly amalgamated with the surfaces of the aluminum work and becomes an integral part thereof. This solder has been found to constitute a very strong binder and in practice it has been discovered that where the solder is applied the work is stronger than at other points of like thickness.

What is claimed is:—

1. A composition of matter for use as a flux in soldering aluminum, including stearic acid, borax, rosin, and a non-fusible fibrous pulverulent material.

2. A composition of matter for use as a flux in soldering aluminum, including stearic acid, borax, rosin, and pulverized cinnamon bark.

In testimony that I claim the foregoing as my own I have hereto affixed my signature in the presence of two witnesses.

AUGUSTUS H. VAN MARTER.

Witnesses:
   J. H. VAN MARTER,
   IVY E. SIMPSON,